United States Patent
Zhang

(10) Patent No.: US 9,656,316 B2
(45) Date of Patent: May 23, 2017

(54) AUTOMATIC PACKING SYSTEM AND METHOD AT PRESS LINE FULL-PART END

(71) Applicant: JINAN DOUBLEWIN AUTOMOBILE EQUIPMENT ENGINEERING CO., LTD., Jinan, Shandong (CN)

(72) Inventor: Sanyi Zhang, Jinan (CN)

(73) Assignee: JINAN DOUBLEWIN AUTOMOBILE EQUIPMENT ENGINEERING CO., LTD., Jinan (CN)

( * ) Notice: Subject to any disclaimer, the term of this patent is extended or adjusted under 35 U.S.C. 154(b) by 0 days.

(21) Appl. No.: 15/029,283

(22) PCT Filed: Nov. 2, 2015

(86) PCT No.: PCT/CN2015/093585
§ 371 (c)(1),
(2) Date: Apr. 14, 2016

(87) PCT Pub. No.: WO2016/045645
PCT Pub. Date: Mar. 31, 2016

(65) Prior Publication Data
US 2016/0368039 A1    Dec. 22, 2016

(30) Foreign Application Priority Data

Jun. 17, 2015  (CN) .......................... 2015 1 0337966
Jun. 17, 2015  (CN) ...................... 2015 2 0420783 U

(51) Int. Cl.
*G06K 9/00*     (2006.01)
*B21D 43/20*    (2006.01)
(Continued)

(52) U.S. Cl.
CPC ............ *B21D 43/20* (2013.01); *B25J 9/1687* (2013.01); *B25J 9/1697* (2013.01); *B25J 19/04* (2013.01); *B65G 47/91* (2013.01); *B65G 61/00* (2013.01)

(58) Field of Classification Search
CPC ....... B21D 43/20; B25J 9/1697; B25J 9/1687; B65G 61/00; B65G 41/91; B26J 19/04
See application file for complete search history.

(56) References Cited

U.S. PATENT DOCUMENTS 5,141,274 A * 8/1992 Hayden .................. B65G 61/00
                                                    294/113
5,337,594 A * 8/1994 Pettersson .............. B21D 37/14
                                                    483/14
(Continued)

FOREIGN PATENT DOCUMENTS

CN         104097796 A       10/2014
CN         204338662 U        5/2015
(Continued)

OTHER PUBLICATIONS

Jan. 25, 2016 International Search Report issued in International Patent Application No. PCT/CN2015/093585.
(Continued)

*Primary Examiner* — Samir Ahmed
(74) *Attorney, Agent, or Firm* — Oliff PLC

(57) ABSTRACT

An automatic packing system and method at a press line full-part end. Robot systems are respectively arranged at both ends of a servo synchronous belt system, a visual system is connected with a PLC controller, the robot systems are connected with a robot controller, the PLC controller is connected with the robot controller, and a charging baskets are connected with a charging basket change system; and parts are conveyed by the servo synchronous belt system, the visual system acquires position image information of the parts and judges position errors of the parts, the PLC controller transmits the position error information to the robot controller, and the robot controller controls a robot to grab the parts and put the parts in corresponding charging baskets according to the shapes of the parts.

10 Claims, 5 Drawing Sheets

(51) Int. Cl.
*B25J 9/16* (2006.01)
*B25J 19/04* (2006.01)
*B65G 47/91* (2006.01)
*B65G 61/00* (2006.01)

(56) References Cited

U.S. PATENT DOCUMENTS

| | | | | |
|---|---|---|---|---|
| 5,380,978 A * | 1/1995 | Pryor | ............... | B23K 26/032 |
| | | | | 219/121.64 |
| 2004/0177669 A1* | 9/2004 | Suzuki | ............. | B21D 43/055 |
| | | | | 72/405.09 |
| 2013/0177250 A1* | 7/2013 | Yamamoto | ......... | G06T 7/0008 |
| | | | | 382/195 |

FOREIGN PATENT DOCUMENTS

| | | | |
|---|---|---|---|
| CN | 104942178 A | 9/2015 | |
| CN | 204685882 U | 10/2015 | |
| JP | 2006-123009 A | 5/2006 | |
| KR | 10-1395121 B1 | 5/2014 | |

OTHER PUBLICATIONS

Jan. 25, 2016 Written Opinion issued in International Patent Application No. PCT/CN2015/093585.

* cited by examiner

AUTOMATIC PACKING SYSTEM AND METHOD AT PRESS LINE FULL-PART END

The present invention relates to the field of automatic production technology, and in particular, to an automatic packing system and method at a press line full-part end.

BACKGROUND OF THE INVENTION

At present, robots/mechanical arms have been installed on the majority of automobile press lines to replace manual production to form automatic press production lines, which greatly improves the production efficiency and reduces the labor cost, however, at the existing automatic press production line ends, after being discharged, parts are still manually stacked and packed, or only side walls and other large parts are automatically packed, this method greatly hinders the production efficiency of the production lines, requires a lot of manpower and material resources and is likely to cause potential safety hazards.

The Chinese patent CN201410315136.1 discloses an automatic stream line structure for stamping structure parts, a material is produced by a production mechanism and is delivered to a line end discharging mechanism by a delivery mechanism, the line end discharging mechanism includes a control device, a discharging robot and a material stack transport frame, the control device is connected with the discharging robot, and the control device controls the discharging robot to pick up the material delivered by the delivery mechanism and put the material in the material stack transport frame. The technology can achieve automatic packing of the material, however, it does not consider position errors generated by the discharged parts with a belt conveyor in a conveyance process and the problem of random part positions caused by manual quality inspection after the parts are discharged from the line end; and meanwhile, the solution can only be used for automatically packing parts with fixed shapes and sizes, when the part structures are changed, corresponding transport frames need to be changed, and parts with different shapes and sizes cannot be automatically packed.

SUMMARY OF THE INVENTION

The object of the present invention is to provide an automatic packing system and method at a press line full-part end for solving the above problems. The uncertainty of positions and sizes of parts at the line end are fully considered in the system and the method to achieve automatic packing of the parts at the line end.

To achieve the above object, the present invention adopts the following technical solutions:

an automatic packing system at a press line full-part end includes a servo synchronous belt system, a visual system, a PLC controller, robot systems, a robot controller, charging baskets and a charging basket change system;

the robot systems are respectively arranged at both ends of the servo synchronous belt system, the visual system is connected with the PLC controller, the robot systems are connected with the robot controller, the PLC controller is connected with the robot controller, and the charging baskets are connected with the charging basket change system; and parts are conveyed by the servo synchronous belt system, the visual system acquires position image information of the parts and judges position errors of the parts, the PLC controller transmits the position error information to the robot controller, and the robot controller controls a robot to grab the parts and puts the parts in corresponding charging baskets according to the shapes of the parts.

The servo synchronous belt system includes a servo drive, servo synchronous belts and a position adjusting mechanism;

the servo drive drives the servo synchronous belts to move, and the position adjusting mechanism adjusts the positions of the servo synchronous belts; and the position adjusting mechanism includes a fixing base, a guide rail and a lead screw; the guide rail is connected with the servo synchronous belts, the lead screw is connected with the servo synchronous belts through feed screw nuts for adjusting the distance between the servo synchronous belts, and the guide rail and the lead screw are respectively fixed on the fixing base.

The visual system includes an image acquisition device and a visual auxiliary lighting system; and the image acquisition device is connected with the PLC controller, and the image acquisition device and the visual auxiliary lighting system are both arranged on a mounting bracket above the servo synchronous belts.

The robot system includes robots, a base, a robot end picker, a vacuum generator and a reducing valve; and the robots are fixed on both sides of the servo synchronous belt system through the base, the robots are connected with the robot end picker, and the reducing valve is connected with the vacuum generator for providing a vacuum air pressure for the robot end picker to enable the robot end picker to adsorb the parts.

The robot end picker includes end picker fulcrum bars, a fulcrum bar fixing tray, a manual quick-change connector, a pneumatic quick-change connector, suction cups and air pipes; and the end picker fulcrum bars are fixed on the fulcrum bar fixing tray through the manual quick-change connector, and the fulcrum bar fixing tray is connected with the robots through the pneumatic quick-change connector; and a plurality of suction cups are respectively arranged on each end picker fulcrum bar, and the suction cups are connected with the pneumatic quick-change connector through the air pipes.

A horizontal fulcrum bar used for placing holed parts or an automatic set-reset supporting mechanism used for supporting holeless parts and preventing deformation of the parts is respectively arranged on the charging basket.

The automatic set-reset supporting mechanism includes mounting upright posts arranged on left and right sides in the charging basket respectively, multiple pairs of set-reset supports are oppositely arranged on the mounting upright posts on the left and right sides respectively, and the set-reset supports can rotate on the mounting upright posts to support the parts; the parts are put on a pair of oppositely arranged set-reset supports, and after one part is put in, the set-reset supports of the next part automatically take post to put the next part in.

A working method of the automatic packing system at the press line full-part end includes the following steps:

(1) carrying out quality inspection on the parts, dividing the parts into qualified parts and unqualified parts according to quality inspection results, and respectively conveying the parts on the servo synchronous belts after the quality inspection;

(2) acquiring images of the parts, and judging whether the images are successfully acquired; if the images are successfully acquired, judging part position information according to the image information, comparing the part position information with preset part position information to acquire part position error information, and entering the next step;

if the images are not successfully acquired, conveying the parts into a recovery area;

(3) conveying the parts to a robot grabbing station, and grabbing the parts by the robots; and (4) judging the shapes of the grabbed parts, and putting the parts in corresponding charging baskets according to the shapes of the grabbed parts; and if the current charging basket is full, putting the parts in a new charging basket after the full charging basket is changed.

In the step (1), four narrow servo synchronous belts are used for conveying the parts, and the position of each servo synchronous belt can be adjusted according to the shape features of different parts.

In the step (4), holed parts are put in the charging basket provided with the horizontal fulcrum bar used for hanging the parts;

holeless parts are put in the charging basket provided with the automatic set-reset supporting mechanism, and after one part is put in, the supports of the next part automatically take post to put the next part in.

The present invention has the following beneficial effects:

the present invention determines the part position error information by the image acquisition device, and the robot automatically adjusts the part grabbing position according to the position error information to realize accurate positioning of each part. The synchronous belt of the present invention guarantees no slip of the parts on the belt conveyor to achieve synchronous operation of the parts and the belt conveyor, and meanwhile guarantees no slip of the belt and a synchronous wheel, so that a traveling distance of the belt is a distance output by a servo motor.

In the present invention, the positions of the servo synchronous belts can be adjusted when changing different parts according to practice teaching data to adapt to the demands of a variety of parts.

In the present invention, different charging baskets are arranged for the holed parts and the holeless parts to automatically and sequentially arrange the parts.

BRIEF DESCRIPTION OF THE DRAWINGS

FIG. 4 (*b*) is a schematic diagram of a structure of a male connector portion of the manual quick-change connector of the present invention;

FIG. 5 (*b*) is a schematic diagram of a structure of the automatic set-reset supporting mechanism of the present invention after parts are placed;

wherein, 1 represents a servo synchronous belt, 2 represents a mounting bracket, 3 represents an auxiliary lighting system, 4 represents an intelligent camera, 5 represents a position adjusting mechanism, 6 represents a robot system, 7 represents a charging basket, 8 represents a safety protection system, 9 represents an AGV trolley, 10 represents an AGV trolley rail, 11 represents a recovery area, 12 represents a guide rail, 13 represents a lead screw, 14 represents a feed screw nut, 15 represents a fixing base, 16 represents a startup quick-change connector, 17 represents a fulcrum bar fixing tray, 18 represents a manual quick-change connector, 19 represents a fulcrum bar, 20 represents a suction cup, 21 represents an air pipe, 22 represents a female connector portion, 23 represents a handle, 24 represents a manual pressing device, 25 represents a pressure spring, 26 represents a male connector portion, 27 represents a groove, 28 represents a mounting upright post, 29 represents a set-reset support, and 30 represents a holeless part.

DETAILED DESCRIPTION OF THE EMBODIMENTS

The present invention will be further illustrated below in combination with the accompany drawings and embodiments.

It should be understood that, the numbers of servo synchronous belts 1, visual systems, robots and charging baskets 7 involved in the embodiment of the present invention are merely a specific implementation manner provided by the embodiment, those skilled in the art can voluntarily set the numbers of the components according to actual demands and can adjust the relative positions of the components of the system according to the corresponding numbers.

Figure 1:
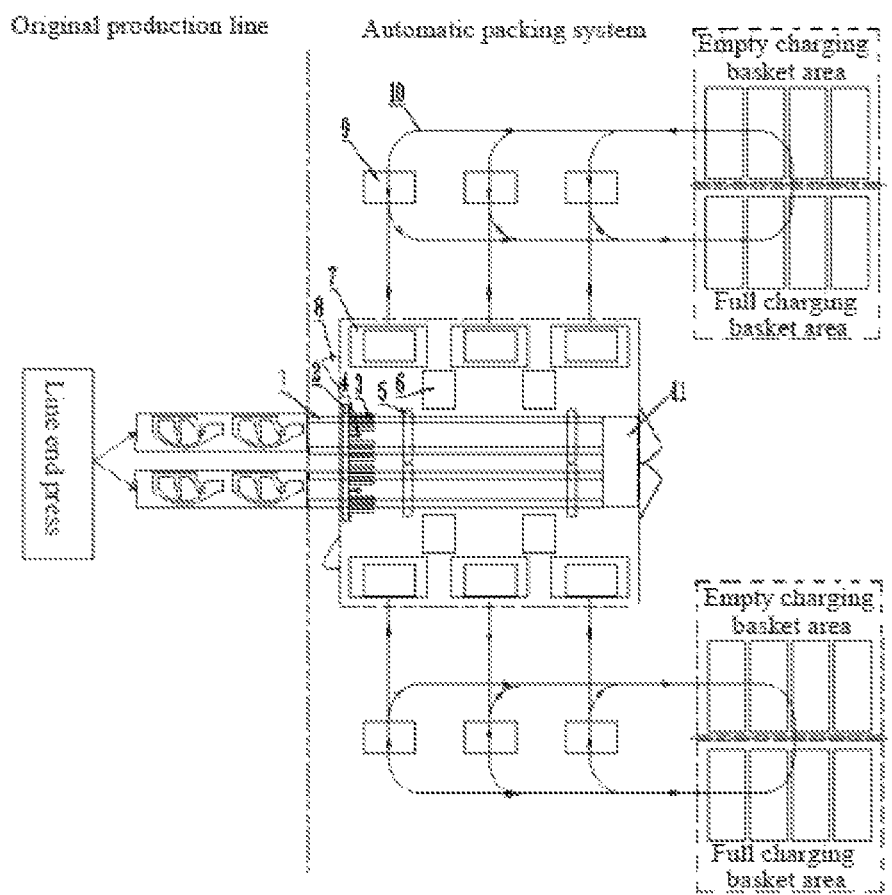
FIG. 1 is a schematic diagram of an overall structure of the present invention.
Figure 2:
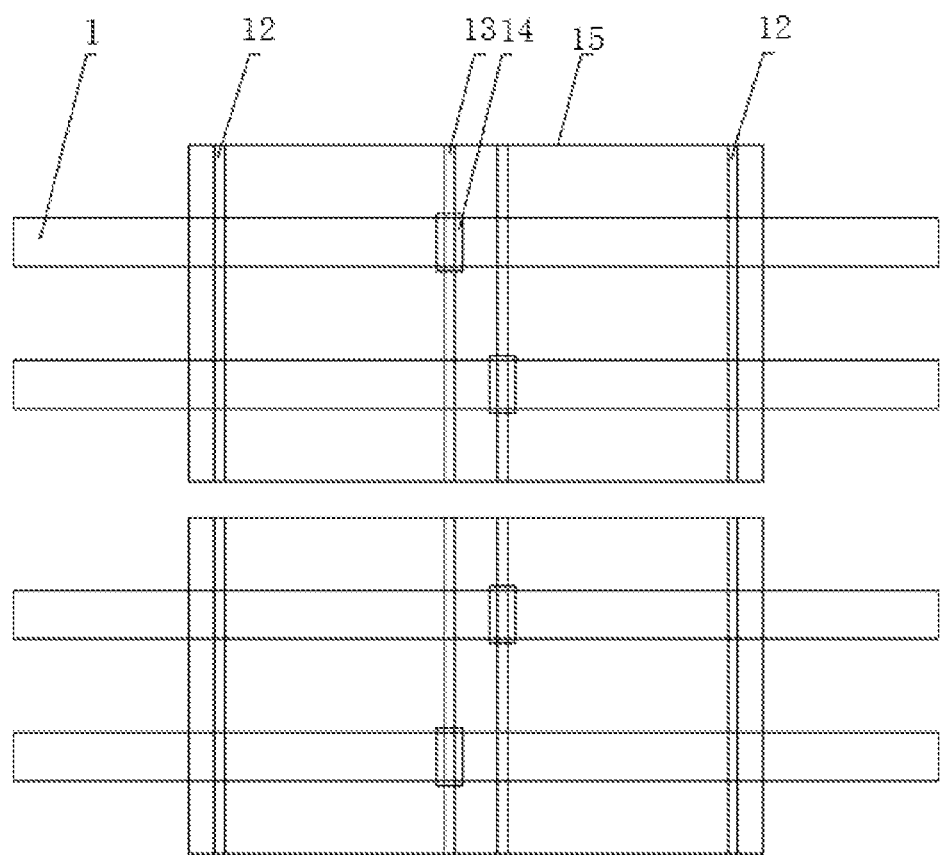
FIG. 2 is a schematic diagram of a structure of a position adjusting mechanism for a servo synchronous belt of the present invention.
Figure 3:
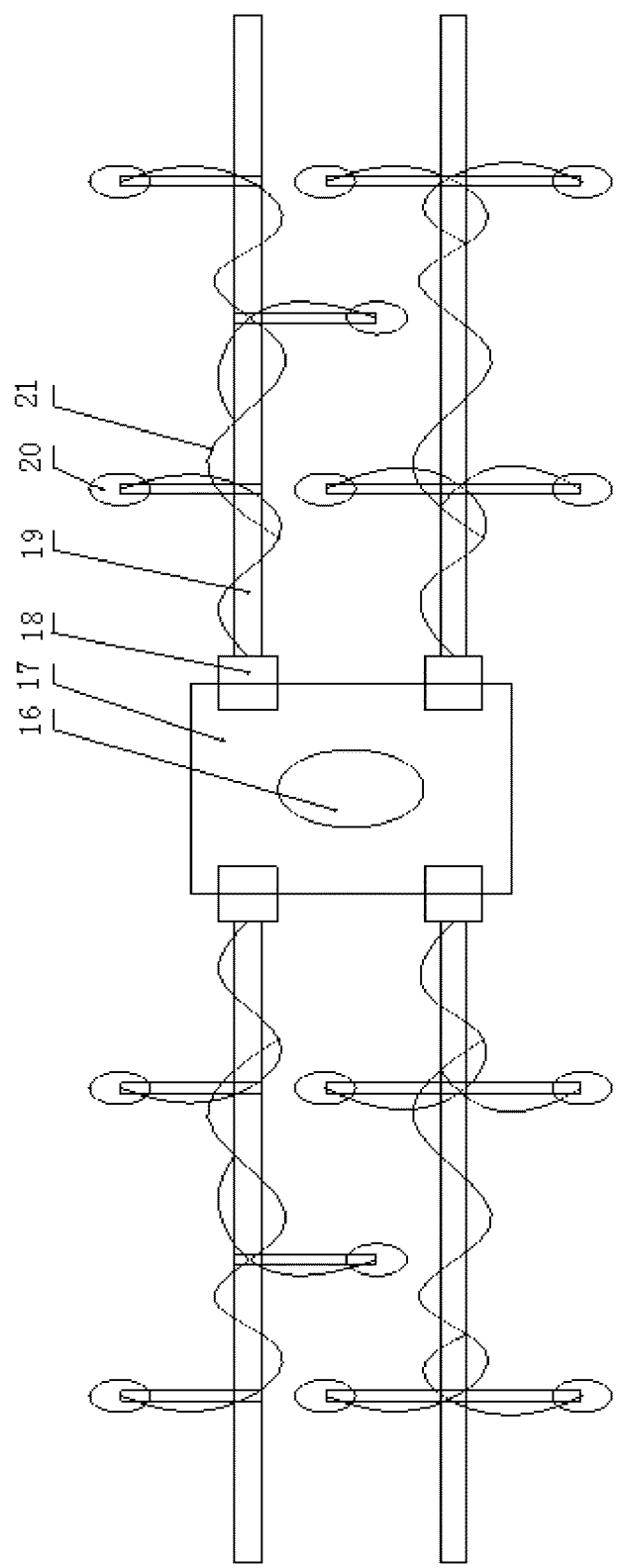
FIG. 3 is a schematic diagram of a structure of a robot end picker of the present invention.

As shown in FIG. 1, an automatic packing system at a press line full-part end includes a servo synchronous belt system, a visual system, a PLC controller, robot systems 6, a robot controller, charging baskets 7, a charging basket change system and a safety protection system 8;

the robot systems 6 are respectively arranged at both ends of the servo synchronous belt system, the visual system is connected with the PLC controller, the robot systems 6 are connected with the robot controller, the PLC controller is connected with the robot controller, and the charging baskets 7 are connected with the charging basket change system; and parts are conveyed by the servo synchronous belt system, the visual system acquires position image information of the parts and judges position errors of the parts, the PLC controller transmits the position error information to the robot controller, and the robot controller controls a robot to grab the part and puts the part in a corresponding charging basket 7 according to the shape of the part.

The functions of the components of the system are described as follows:

A. The servo synchronous belt system is composed of 4 servo synchronous belts 1 and a position adjusting mechanism 5 thereof. The positions of the 4 servo synchronous belts 1 are adjusted by the position adjusting mechanism 5 to adapt to the demands of a variety of parts and accurately convey parts discharged from the line end to each robot grabbing station. Each servo synchronous belt 1 is driven by a servo drive.

The position adjusting mechanism 5 includes a fixing base 15, a guide rail 12 and a lead screw 13; the guide rail 12 is connected with the servo synchronous belts 1 for supporting the servo synchronous belts 1 and playing a guide role when adjusting the positions of the servo synchronous belts 1, the lead screw 13 is connected with the servo synchronous belts 1 through feed screw nuts 14 for adjusting the distance between the servo synchronous belts 1, and the guide rail 12 and the lead screw 13 are respectively fixed on the fixing base 15.

B. The visual system is composed of a visual acquisition device and 12 visual auxiliary lighting systems 3.

The visual system includes the image acquisition device and the visual auxiliary lighting systems 3; the image acquisition device is connected with the PLC controller, and the image acquisition device and the visual auxiliary lighting systems 3 are arranged on a mounting bracket 2 above the servo synchronous belts 1.

The main functions of the visual acquisition device are to photograph parts when the parts are conveyed on the servo synchronous belts 1, compare positions of the parts with a standard part position provided during debugging to calculate error positions of the current parts and transmit position error information to the PLC controller, and the PLC controller transmits the position error information to the robot controller; and the main function of the visual auxiliary lighting systems 3 is to assist the visual acquisition device to adapt to a variety of different weather light to meet the exposure demands of the visual acquisition device when photographing.

In the embodiment, the visual acquisition device is a COGNEX intelligent camera 4, and PHILIPS visual auxiliary lamplight is used to assist the visual acquisition device.

C. The robot system 6 includes 4 special stamping carrying robots, and each robot is respectively fixed on a corresponding base. The main function of the special stamping carrying robots is to carry the parts conveyed by the servo synchronous belts 1 to the charging baskets 7 after accurately positioning the current parts according to the position information provided by the COGNEX intelligent camera 4. The main function of the mounting base is to firmly and stably fix the special stamping carrying robots.

The robot system 6 further includes robot end pickers, the robot end pickers provide a vacuum air pressure through a vacuum system to adsorb the parts, and each robot end picker is mainly composed of 4 end picker fulcrum bars 19, a manual quick-change connector 18, a plurality of suction cups 20 and air pipes 21. The end picker fulcrum bars 19 are fixed on a fulcrum bar fixing tray 17 through the manual quick-change connector 18, and the fulcrum bar fixing tray 17 is connected with the robots through a pneumatic quick-change connector 16; and a plurality of suction cups 20 are respectively arranged on each end picker fulcrum bar 19, the suction cups 20 are connected with the pneumatic quick-change connector 16 through the air pipes 21, the main function of the robot system is to adjust the positions of the suction cups 20 according to the shapes of a variety of parts, and the vacuum system provides power to suck the parts to be carried by the robots.

Figure 4:
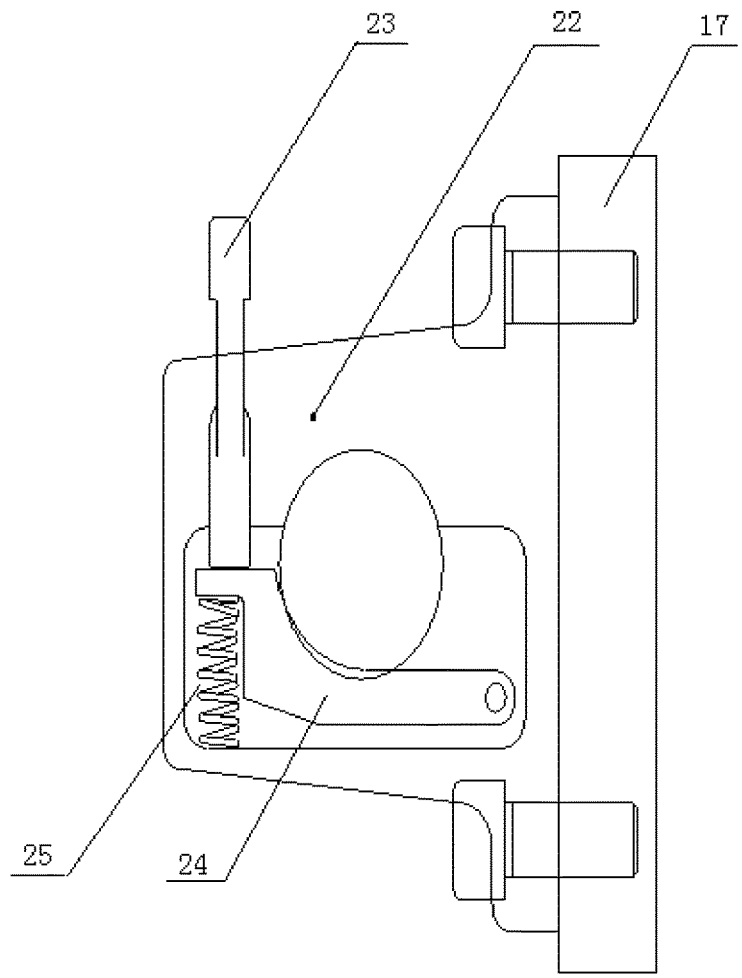
FIG. 4 (*a*) is a schematic diagram of a structure of a female connector portion of a manual quick-change connector of the present invention.
Figure 4:
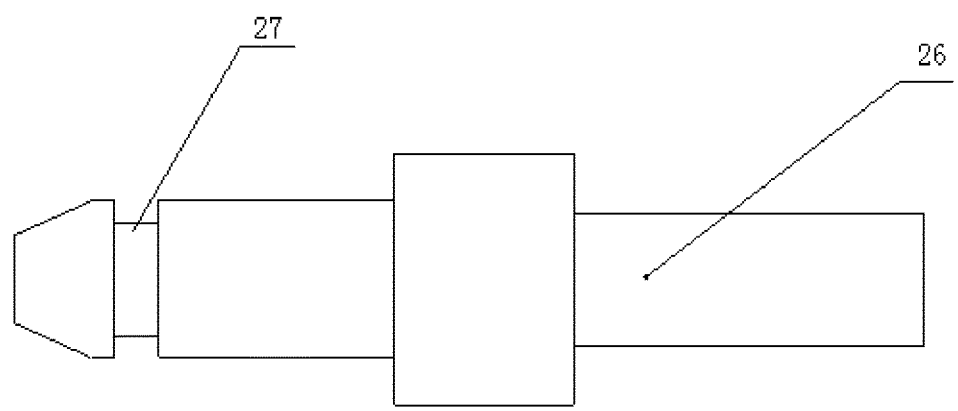

The manual quick-change connector 18 has a structure as shown in FIG. 4 (a) and FIG. 4 (b), including a female connector portion and a male connector portion, wherein the female connector portion 22 is fixed on the fulcrum bar fixing tray 17 through a bolt, a hole for inserting the male connector is formed in the middle of the female connector, a manual pressing device 24 is arranged at a position close to the hole, a handle 23 and a pressure spring 25 are arranged on the manual pressing device 24, and the spring is pressed by the handle 23 to fix and separate the female connector and the male connector; and the male connector portion 26 is provided with a groove 27 matched with the manual pressing device 24.

When in use, the pressure spring 25 is pressed by the handle 23 to press the manual pressing device 24, so that the manual pressing device 24 is separated from the hole, after the male connector is inserted, the spring is loosened, the manual pressing device 24 is clamped in the groove 27 arranged on the male connector so as to fix the male connector, and thus the male connector is fixedly connected with the female connector; when requiring separation, the pressure spring 25 is pressed by the handle 23 to press the manual pressing device 24, and the male connector is pulled out.

Each vacuum system is composed of two SCHMALZ vacuum generators, a plurality of air pipes 21 and connectors of the air pipes 21, the vacuum system provides power through an air path system, and the air path system is composed of an SMC filtering reducing valve and a plurality of air pipes 21.

D. With regard to the charging basket 7 and the charging basket change system, the charging basket 7 is additionally provided with a horizontal fulcrum bar or a mechanical automatic set-reset supporting mechanism for meeting the packing demands of the robots. Holed parts are stored in a hanging manner, namely one or more horizontal fulcrum bars are added at holes or depressions used for hanging the parts in the charging basket 7, so as to hang the parts; and mechanical automatic set-reset supports 29 are manufactured for holeless or flat plate materials, and after one part is put in, the supports of the next part automatically take post to put the next part in.

Figure 5:
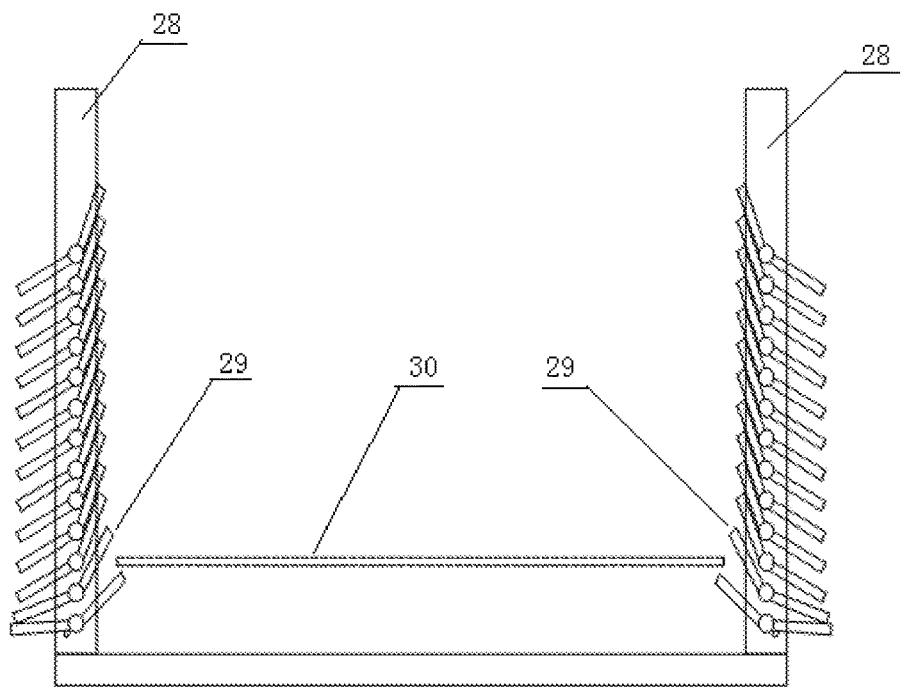
FIG. 5 (*a*) is a schematic diagram of a structure of an automatic set-reset supporting mechanism of the present invention at an initial position.
Figure 5:
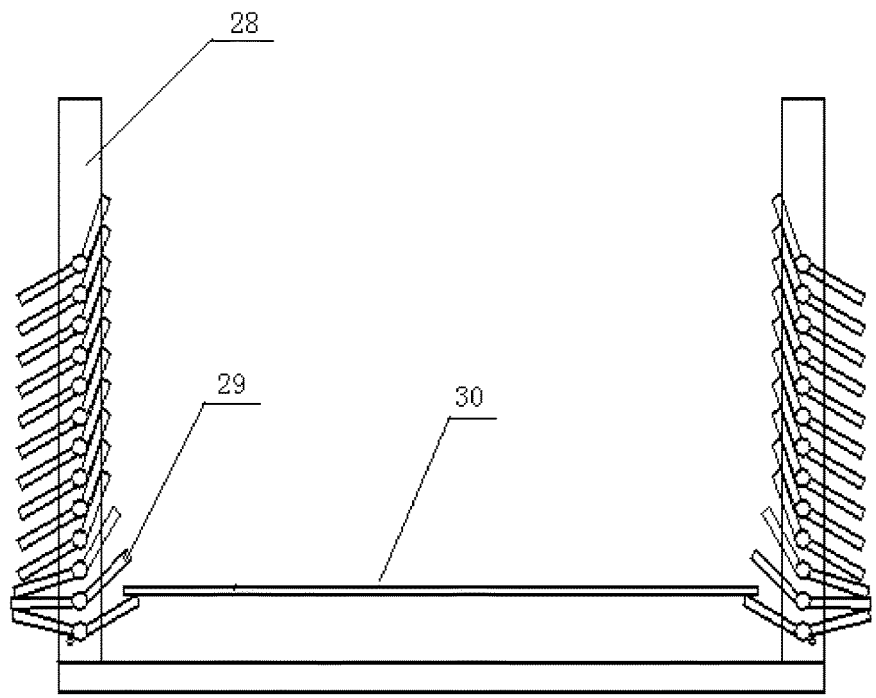

As shown in FIG. 5, the automatic set-reset supporting mechanism includes mounting upright posts 28 arranged on left and right sides in the charging basket 7 respectively, multiple pairs of set-reset supports 29 are oppositely arranged on the mounting upright posts 28 on the left and right sides respectively, and the set-reset supports 29 can rotate on the mounting upright posts 28 to support the parts; and the parts are put on a pair of oppositely arranged set-reset supports 29, and after one part is put in, the set-reset supports 29 of the next part automatically take post to put the next part in.

Each charging basket change system adopts an AVG trolley 9 to change the charging basket, the AVG trolley 9 moves along an operation rail thereof, and an AVG trolley rail 10 penetrates through an area of a full charging basket 7 and an area of an empty charging basket 7.

E. The function of the PLC controller is to receive the image position information of the image acquisition device, compare the image position information with a piece of standard part position information provided during debugging to acquire position error information of the parts and transmit the acquired position error information to the robot controller. The position information is position coordinate information of the parts on a belt conveyor plane. The position information includes rotation angles around an X direction, a Y direction and a Z direction.

The function of the robot controller is to control the robots to accurately move to the positions of the parts according to the received position error information of the parts and grab and store the parts.

In addition, the automatic packing system at the press line full-part end further includes a plurality of remote IO substations, a PROFACE touch screen and the like, in order to remotely control the automatic packing system.

The working process of the automatic packing system at the press line full-part end of the present invention is specifically as follows:

(1) quality inspection is carried out on the parts, the parts are conveyed by the servo synchronous belts 1 after the quality inspection; and the quality inspection is carried out to judge whether the parts are qualified parts, the qualified parts are put in an OK charging basket 7, and unqualified parts are put in an NG charging basket 7.

Four narrow servo synchronous belts 1 are used for conveying the parts, and the position of each servo synchronous belt 1 can be adjusted according to the shape features of different parts.

(2) Images of the parts are acquired, and whether the images are successfully acquired is judged; if the images are successfully acquired, part position information is judged according to the image information, and the part position information is compared with a piece of standard part position information provided during debugging to acquire part position error information;

if the images are not successfully acquired, the parts enter a recovery area 11.

(3) The parts enter a robot grabbing station, and the robots grab the parts and judge whether the grabbed parts are holed parts;

the holed parts are put in the charging baskets 7 provided with the horizontal fulcrum bars used for hanging the parts; and the holeless parts 30 are put in the charging baskets 7 provided with the automatic set-reset supporting mechanisms, and after one part is put in, the supports of the next part automatically take post to put the next part in.

(4) If the current charging basket 7 is full, the parts are put in the charging basket 7 after the charging basket 7 is changed.

After the parts are discharged from the line end, whether the parts are qualified needs to be manually inspected, therefore the discharged parts may be manually and randomly moved, and the positions have randomness. The intelligent camera 4 is used in the present invention to photograph each part, and the position of each part is compared with the part positions during practice teaching to acquire the position error information of each part, the acquired position error information is transmitted to the PLC controller, the PLC controller transmits the information to the robot controller, the robot controller automatically adjusts the part grabbing position according to the position error information to accurately position each part.

After being discharged, the parts may generate position errors with the belt conveyor in the conveying process, resulting in that the position error information after visual photography is inconsistent with an actual position error, and that the robots cannot accurately grab the parts. The servo synchronous belt 1 is adopted in the present invention to guarantee in a servo manner accurate conveyed distances of the parts after visual photography on the belt conveyor, the synchronous belt guarantees no slip of the parts on the belt conveyor to achieve synchronous operation of the parts and the belt conveyor, and meanwhile guarantees no slip of the belt and a synchronous wheel, so that a traveling distance of the belt is a distance output by a servo motor.

Different parts have different sizes, different heights and different shapes, four narrow servo synchronous belts 1 are used in the present invention, the position of each servo synchronous belt 1 can be adjusted according to the shape features of different parts, and when changing different parts, the positions of the four servo synchronous belts 1 are adjusted according to the data of a piece of standard part position information provided during debugging to adapt to the demands of a variety of parts.

Different parts have different shapes, and thus cannot be stored by the same charging basket 7. In the present invention, holed parts are stored in a hanging manner, namely one or more horizontal fulcrum bars are added at holes or depressions for hanging the parts in the charging basket 7, so as to hang the parts; and the mechanical automatic set-reset supports 29 are manufactured for holeless or flat plate materials, and after one part is put in, the supports of the next part automatically take post to put the next part in.

Although the specific embodiments of the present invention have been described above in detail in combination with the accompany drawings, the protection scope of the present invention is not limited thereto. Those skilled in the art to which the present invention belongs should understand that, a variety of modifications or variations, made by those skilled in the art based on the technical solutions of the present invention without any creative effort, should still fall into the protection scope of the present invention.

The invention claimed is:

1. An automatic packing system at a press line end, comprising a servo synchronous belt system, a visual system, a PLC controller, robot systems, a robot controller, charging baskets and a charging basket change system;

the robot systems are respectively arranged at both ends of the servo synchronous belt system, the visual system is connected with the PLC controller, the robot systems are connected with the robot controller, the PLC controller is connected with the robot controller, and the charging baskets are connected with the charging basket change system; and parts are conveyed by the servo synchronous belt system, the visual system acquires position image information of the parts and judges position errors of the parts, the PLC controller transmits the position error information to the robot controller, and the robot controller controls a robot to grab the parts and puts the parts in corresponding charging baskets according to the shapes of the parts.

2. The automatic packing system at the press line full-part end of claim 1, wherein the servo synchronous belt system comprises a servo drive, servo synchronous belts and a position adjusting mechanism;

the servo drive drives the servo synchronous belts to move, and the position adjusting mechanism adjusts the positions of the servo synchronous belts; and the position adjusting mechanism comprises a fixing base, a guide rail and a lead screw; the guide rail is connected with the servo synchronous belts, the lead screw is connected with the servo synchronous belts through feed screw nuts for adjusting the distance between the servo synchronous belts, and the guide rail and the lead screw are respectively fixed on the fixing base.

3. The automatic packing system at the press line full-part end of claim 1, wherein the visual system comprises an image acquisition device and a visual auxiliary lighting system; and the image acquisition device is connected with the PLC controller, and the image acquisition device and the visual auxiliary lighting system are both arranged on a mounting bracket above the servo synchronous belts.

4. The automatic packing system at the press line full-part end of claim 1, wherein the robot system comprises robots, a base, a robot end picker, a vacuum generator and a reducing valve; and the robots are fixed on both sides of the servo synchronous belt system through the base, the robots are connected with the robot end picker, and the reducing valve is connected with the vacuum generator for providing a vacuum air pressure for the robot end picker to enable the robot end picker to adsorb parts.

5. The automatic packing system at the press line full-part end of claim 4, wherein the robot end picker comprises end picker fulcrum bars, a fulcrum bar fixing tray, a manual quick-change connector, a pneumatic quick-change connector, suction cups and air pipes; and the end picker fulcrum bars are fixed on the fulcrum bar fixing tray through the manual quick-change connector, and the fulcrum bar fixing tray is connected with the robots through the pneumatic quick-change connector; and a plurality of suction cups are respectively arranged on each end picker fulcrum bar, and the suction cups are connected with the pneumatic quick-change connector through the air pipes.

6. The automatic packing system at the press line full-part end of claim 1, wherein a horizontal fulcrum bar used for placing holed parts or an automatic set-reset supporting mechanism used for supporting holeless parts and preventing deformation of the parts is respectively arranged on the charging basket.

7. The automatic packing system at the press line full-part end of claim 6, wherein the automatic set-reset supporting mechanism comprises mounting upright posts arranged on left and right sides in the charging basket respectively, multiple pairs of set-reset supports are oppositely arranged on the mounting upright posts on the left and right sides respectively, and the set-reset supports can rotate on the mounting upright posts to support the parts; the parts are put on a pair of oppositely arranged set-reset supports, and after one part is put in, the set-reset supports of the next part automatically take post to put the next part in.

8. A working method of the automatic packing system at the press line full-part end of claim 1, implementing the following steps:

(1) carrying out quality inspection on the parts, dividing the parts into qualified parts and unqualified parts according to quality inspection results, and respectively conveying the parts on the servo synchronous belts after the quality inspection;

(2) acquiring images of the parts, and judging whether the images are successfully acquired; if the images are successfully acquired, judging part position information according to the image information, comparing the part position information with preset part position information to acquire part position error information, and entering the next step;

if the images are not successfully acquired, conveying the parts into a recovery area;

(3) conveying the parts to a robot grabbing station, and grabbing the parts by the robots; and (4) judging the shapes of the grabbed parts, and putting the parts in corresponding charging baskets according to the shapes of the grabbed parts; and if the current charging basket is full, putting the parts in a new charging basket after the full charging basket is changed.

9. The working method of the automatic packing system at the press line full-part end of claim 8, wherein in the step (1), four narrow servo synchronous belts are used for conveying the parts, and the position of each servo synchronous belt can be adjusted according to the shape features of different parts.

10. The working method of the automatic packing system at the press line full-part end of claim 8, wherein in the step (4), holed parts are put in the charging basket provided with the horizontal fulcrum bar used for hanging the parts; and holeless parts are put in the charging basket provided with the automatic set-reset supporting mechanism, and after one part is put in, the supports of the next part automatically take post to put the next part in.

* * * * *